Dec. 6, 1966 H. L. FARMER 3,289,386
METHOD OF MAKING LABELED PACKAGE
Original Filed March 1, 1963 2 Sheets-Sheet 1

INVENTOR
HAROLD L. FARMER

BY Glenn, Palmer, Matthews & Lyne
ATTORNEYS

Dec. 6, 1966     H. L. FARMER     3,289,386
METHOD OF MAKING LABELED PACKAGE
Original Filed March 1, 1963     2 Sheets-Sheet 2

INVENTOR
HAROLD L. FARMER

BY Glenn, Palmer, Matthews & Lyne
ATTORNEYS

United States Patent Office 3,289,386
Patented Dec. 6, 1966

3,289,386
METHOD OF MAKING LABELED PACKAGE
Harold L. Farmer, Henrico County, Va., assignor to Reynolds Metal Company, Richmond, Va., a corporation of Delaware
Original application Mar. 1, 1963, Ser. No. 262,045. Divided and this application Sept. 23, 1964, Ser. No. 403,685
2 Claims. (Cl. 53—28)

This is a division of application Serial No. 262,045, filed March 1, 1963, now Patent No. 3,207,300.

This invention relates to a method of labeling and packaging articles such as bulk produce and the novel package resulting therefrom. More particularly, the invention comprises a heat-sealed shrink-wrapped package and method of making the same, wherein labeling of the contents is efficiently performed and provided at the lowest possible cost.

In known methods of packaging bulky articles such as bananas or carrots, the articles or produce are enclosed in either a single thermoplastic web which is wrapped about the produce and thereafter longitudinally seamed to form a tube and thence transversely sealed at opposite ends to form the completed package, or two webs of packaging material are placed about the articles and peripherally sealed together to form a substantially rectangular bag containing the articles or produce. Similarly, in the packaging of a multiplicity of smaller products or granular materials, such as radishes or rice, a single web of thermoplastic material is formed into a vertical tube, longitudinally seamed, and provided with a lower transverse seal. The articles are then placed within the tube and a top transverse seal is formed, the completed package then being severed from the subsequently formed tube thereabove.

In any of these widely used packaging techniques, it is conventional practice to preprint a full packaging width of thermoplastic web with suitable advertising indicia to indicate trademark, manufacturer, contents, and to otherwise present an attractive merchantable package, non-printed areas of the packaging film being substantially transparent to permit viewing of the package contents. Transparent thermoplastic packaging material of sufficient width for packaging elongated articles such as bananas is readily available and at relatively low cost. However, the imprinting of such wide webs with trademark indicia or other ornamentation significantly increases the cost thereof as compared with an unprinted web, thereby effectively precluding many processors and packagers for economic reasons from using thermoplastic films which otherwise have many desirable packaging properties.

Efforts have been made to avoid the very high expense of full-width printed packaging film, which however have proven unsatisfactory. For example, suitably printed paper or similar labels have been adhesively secured to the outside of thermoplastic bags or packages. But such labels do not always adhere well to packaging materials of polyethylene, polyvinyl chloride, etc. Further, such labels become detached, defaced or damaged in the handling of the articles between packager and consumer. As an alternative, small labels have been inserted inside the wrapping along with the articles or produce. Labels provided in this manner, however, become intermingled with the products and become obscured. Further when such labels are used with heat-shrinkable overwraps, the shrinking process tends to wrinkle and distort the inserted label. Additionally, the insertion of such labels along with the products requires additional manufacturing or handling steps, thereby nullifying a portion of the cost saving from not using printed webs.

It is therefore a principal object of this invention to provide a method of packaging and labeling which effectively overcomes the deficiencies of present methods as above set forth.

A further object is to employ highly desirable printed thermoplastic film, but in the form of a label strip which is separate from and appreciably narrower than the full-width unprinted packaging film, thereby avoiding the considerable expense of full-width printed packaging film.

It is a further object to provide a package wherein the label strip is disposed within the package with the articles, thereby protecting the label from marring or damage, but wherein the label strip cannot become mingled with or obscured by the packaged articles.

It is a further object to provide a label strip which is compatible with and not affected adversely by the use of heat-shrinkable packaging material.

A further object is to provide a label strip which may be of thinner gauge than is the case when the full-width film is printed for use as a label.

Other objects and advantages of my improved method of packaging and package resulting therefrom will be apparent from the following description taken in connection with the accompanying drawings, in which.

Figure 1:
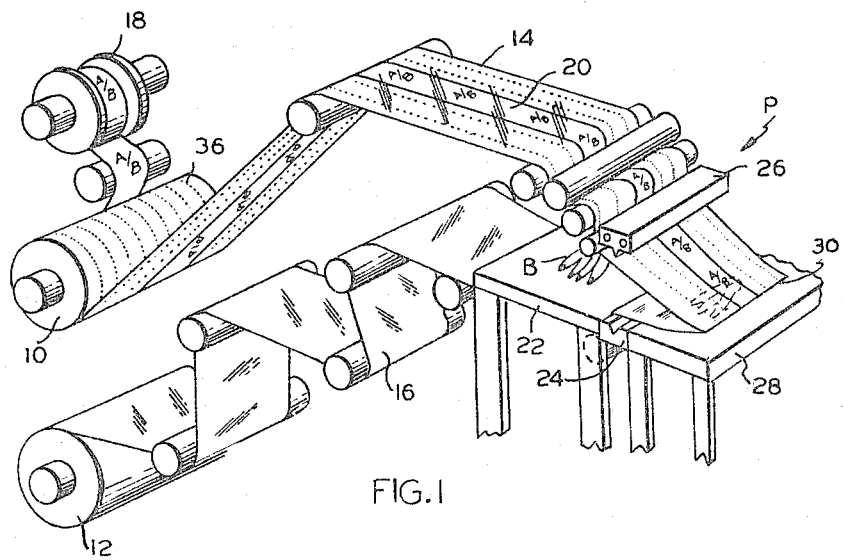
FIG. 1 is a perspective view schematically illustrating apparatus by which the subject method may be performed in producing the package.

In more detail, and referring to the drawings, a pair of supply rolls 10, 12 of full-width transparent thermoplastic packaging film are provided from which web lengths 14, 16, respectively, are trained over conventional guiding, support, and tensioning rollers toward the packaging station P. Any of a number of suitable transparent thermoplastic packaging materials may be readily employed, although a preferred film material for this purpose is heat-shrinkable, oriented polyvinyl chloride.

The web material is of conventional thickness for packaging purposes, on the order of three-quarters or one mil. As indicated, the termoplastic film is heat-shrinkable, and is preferably of the MD (machine direction) type, i.e. the packaging material when subjected to appropriate heat treatment will shrink longitudinally or in a direction corresponding to its direction of feed from the supply rolls. The expression "thermoplastic" is used herein in a very general sense and it is not intended thereby to exclude thermosetting materials which are otherwise suitable.

A supply roll 18 of similar, but relatively narrow, thermoplastic film is provided adjacent roll 10, this film being pre-printed with appropriate indicia and/or ornamentation, as represented by the legend "A/B" thereon. A length 20 of the label film is drawn from the supply roll 18 thereof and is trained around the supply roll 10 of wide transparent film so that the label film underlies the wide packaging film substantially centrally thereof as seen in FIG. 1, with the indicia thereof being readily visible through the transparent upper web length 14. The label film is preferably also polyvinyl chloride, but inasmuch as the same does not constitute the primary package-forming film, the same may be of appreciably less thickness, on the order of one-half mil. As the cost of pre-printed thermoplastic film varies directly with thickness as well as width, it will be seen that my invention further reduces the cost of the printed labeling film as compared to prior packaging methods above discussed. The regularity and spacing of the printed indicia on the label film 20 will of course vary depending upon the desired length of the package ultimately formed, or the indicia may be in repetitive short lengths, whereby the resultant package will include a plurality of repetitive labels, of which at least one will be fully visible and not severed or included in the end seams of the packages. It will be noted that the narrow label film 20 is guided over a major circumferential portion of the full-width supply roll 10, which coupled with the several guiding and tensioning rollers between the supply roll and the packaging station, cause the label film length 20 to be firmly pressed into intimate and smooth contact with the superposed full-width packaging film 14. This technique maximizes the natural tendency of thermoplastic films to adhere to each other, and establishes a substantially molecular contact therebetween along the full lengths of the packaging and label films 14, 20. This constitutes a significant feature of my packaging method, as a result of which the label film will remain in snug, effectively bonded contact with the wide packaging film throughout further packaging steps and subsequent handling of the completed package. In this manner, conventional means such as adhesive applicators, heat sealing bars or the like for securing the label film to the package web which are necessary in present packaging procedures are entirely eliminated.

The lower web 16 of wide packaging material is trained under an article support table 22 and thence upwardly over the front lip of the table and over a lower heat sealing anvil 24 of conventional form. An upper transverse sealing bar and severing knife assembly 26 is provided, the assemblies 24 and 26 being relatively movable in usual fashion by a foot pedal or the like so as to form a trailing transverse seal 32 of a partially completed package, a leading transverse seal 30 of a subsequent package to be formed, and also sever the partially completed tubular package as at A from the advanced web lengths 14, 16, 20.

Figure 2:
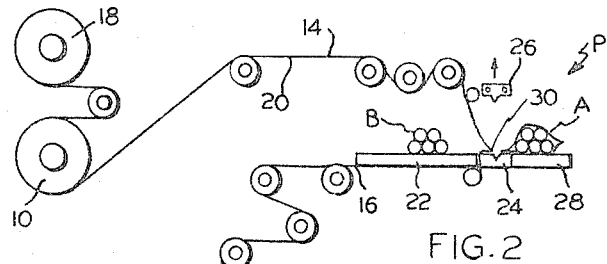
FIG. 2 is a side elevation in schematic form illustrating one step in the method.
Figure 5:
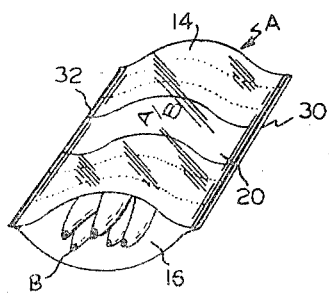
FIG. 5 is a perspective view of the partially completed package.

Thus, as seen in FIG. 2, a tubular package A has been formed and is resting upon package table 28, such partially completed tubular package being shown in FIG. 5. As the sealing and severing bar 26 has been elevated in FIG. 2, the terminal edges of the web lengths 16, 14 and label length 20 are transversely sealed at 30 to form the leading edge of a package to be subsequently formed, with the label strip 20 adhering tightly to the undersurface of the top web 14 rearwardly from the sealed edge 30, as above explained.

With this arrangement, and following completion of a preceding tubular package A, a charge of articles, such as bananas B, is laterally inserted fully between and within the superposed full-width webs 14, 16 by an attendant standing in front of table 28, and placed upon the table 22. Thereafter, the attendant manually grasps the ends of the bananas from either or both sides of the apparatus and draws the banana charge toward him as indicated by the arrow in FIG. 3, the banana charge thereby bearing against the leading transverse seal 30 of the web lengths 14, 16, 20. The packaging film thus tends to substantially conform to the leading portion of the banana charge.

While this transverse seal has been exaggerated in the drawings for the purpose of clarity, in practice the transverse seal is on the order of one-thirty-second of an inch in width or less, depending upon the particular construction of the heat sealing bar and anvil 26, 24.

As the operator continues to draw the bananas toward him against the fused edge 30 of the packaging and label webs, the bananas advance from the table 22 to the packaging table 28, thereby drawing off additional lengths of packaging and label film from the supply rolls thereof. As further lengths of the upper packaging web 14 and label strip 20 are thus drawn, the same are ironed in close intimate contact to insure continued firm adherence of the label strip to the underside of the packaging web.

Figure 3:
FIG. 3 is a partial side schematic elevation corresponding to FIG. 1.
Figure 4:
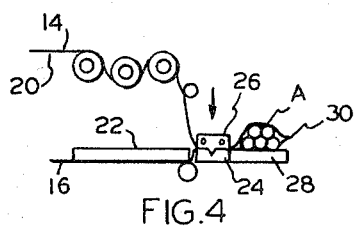
FIG. 4 is a partial side schematic elevation illustrating another step in the method.

After the package charge B has been advanced over table 28 to the position of FIG. 3, upper sealing and severing bar 26 is actuated to descend against anvil 24, thereby forming the trailing transverse seal 32 on the tubular package A thus formed, severing the package from the advancing web lengths, and forming the leading transverse seal 30 of a succeeding package.

Thus, as seen in FIG. 5, the label strip 20 is disposed within the tubular package A in intimate contact with and beneath the upper transparent sheet 14 thereof, the terminal ends of the label strip being secured in the transverse seals 30, 32.

Figure 6:
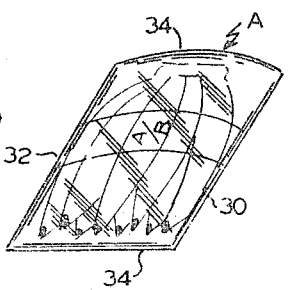
FIG. 6 is a perspective view of the completely sealed package.
Figure 7:
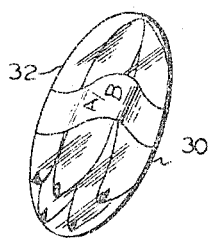
FIG. 7 is a perspective view of the completed package after heat shrinkage thereof.

The open ends of the package A are then sealed as at 34, FIG. 6, by conventional heat sealing means, forming a completely sealed bag or pouch enclosing the contents. While the package at this state is fully sealed and may be handled and shipped in this manner, it is preferable to heat shrink the package whereby thermoplastic material will conform snugly to the contents therewithin to facilitate packing and handling of the same by the processer and ultimate consumer. Such heat shrinking is accomplished by conventional means to result in the completed heat-shrunk package illustrated in FIG. 7.

One or both transparent webs 14, 16 are preferably provided with a series of minute pin holes 36 (FIG. 1) to permit escape of entrapped air from the package interior during shrinking and reduction of the internal volume thereof.

As above stated, a preferable packaging and label material is oriented polyvinyl chloride which is shrinkable in the direction of machine feed, i.e. lengthwise of the label strip 20 in FIG. 5. Since the label strip 20 shrinks uniformly with the transparent wrapping, no distortion or curling thereof results during the shrinking process. Although not a preferred material, biaxially-oriented packaging film may be employed which shrinks both longitudinally and transversely of the package. Film materials which shrink transversely or in the cross direction only have been found to be less desirable in the instant packaging method as adversely affecting the legibility of the enclosed label and/or the tight bonding thereof to the underside of the top web 14. Further, with semi-rigid, relatively tapered products as bananas or carrots, cross-direction shrinkage without equivalent lengthwise shrinkage tends to exert stresses in the packaging material which may weaken the heat-sealed seams.

It will be noted in the package produced by the above method that the upper web length 14 and label strip 20 associated therewith account for at least one-half and preferably about sixty percent of the total length of material surrounding the contents. This provides a further significant economy in the effective labeling of the package as compared with packaging methods which completely encircle the contents wtih a band-type label. As above noted, it is the cost of printed thermoplastic film which is a chief factor in packaging economics, and by associating the label material with only the upper transparent web, the cost of printed material is materially reduced from that necessary to surround or band the entire package. Further, when such packages are set out for display in a grocery or other retail outlet, a labeled portion present on the underside of the package is not visible and the value thereof is wasted, all of which is avoided in the present packaging technique.

Figure 8:
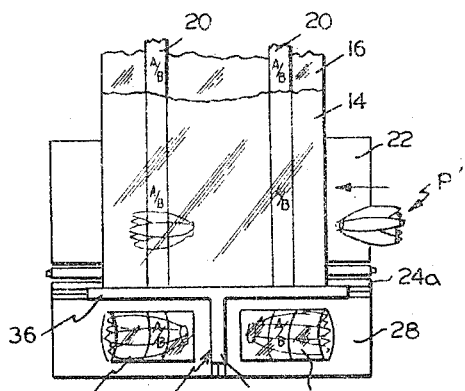
FIG. 8 is a top schematic plan view illustrating a modified method.
Figure 9:
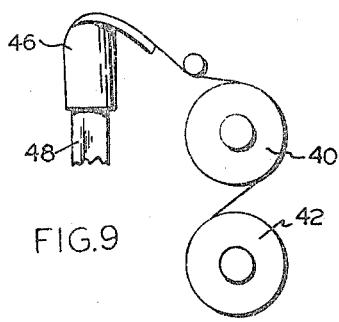
FIG. 9 is a partial schematic side view in a second modified method of making the package.
Figure 10:
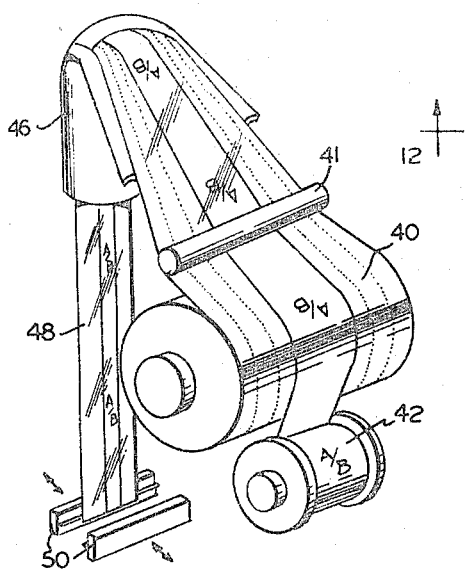
FIG. 10 is a schematic perspective view of the modified method of FIG. 9.

Modification of the method for multiplied output by dual-line package formation is shown in FIG. 8. In a manner similar to FIG. 1, lengths 14, 16 of transparent packaging material of full double-width are fed toward a packaging station P′, the lower web 16 passing beneath the table 22 as before. A pair of label strip lengths 20 are intimately associated with the underside of the upper web 14 in spaced parallel relation. The upper sealing and severing bar 26a is of T-shape, including a transverse portion 36 comparable to the element 26 of FIG. 1, and further including a forwardly extending leg 38 provided with a similar central knife and parallel heat sealing surfaces on either side thereof. The lower anvil 24a is of corresponding T-configuration. In this embodiment, following the formation of a leading transverse seal 30 of the web materials, the attendant laterally inserts two transversely aligned, spaced charges of articles from both sides. Then, holding the ends of the respective article groups in each hand, the operator draws the same forwardly as before, to advance the articles over the table 28, thereby drawing off equivalent lengths of packaging material from the supplies thereof. Thereupon, the sealing and severing T-bar 26a is actuated to form a trailing transverse seal 32 of each of two partially completed packages and sever the same from the web materal rearwardly thereof, while the additional forwardly extending leg 38 of the T-bar similarly longitudinally seals the adjacent ends of the tubular packages C, C′, and severs the same, the resultant pouch or cup-like packages being illustrated after having been laterally separated from the sealing bar in FIG. 8. With his arrangement, it is only necessary for an attendant to close the single remaining open end of each pouch to fully enclose the articles. In this form of the invention package output can be virtually doubled, and further, there remains only the single unsealed open end of each package to be thereafter closed after removal of the partially completed packages from the table 28.

Figure 11:
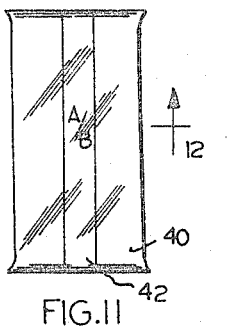
FIG. 11 is a plan view of the resultant package produced from the method of FIGS. 9 and 10; and, FIG. 12 is a partial sectional view along the lines 12—12 of FIG. 11.
Figure 12:
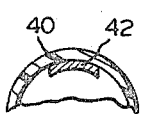

It will be seen from the foregoing that the present labeling technique of the instant invention may be applied to packages formed in other manners. Application thereof to a different packaging technique is illustrated in FIGS. 9–12. As shown, there is provided a single roll of transparent thermoplastic film 40, which may be perforated for heat shrinking if desired, and a narrow web supply 42 of similar label material. The label material lies in intimate contcat in overlying relation to the transparent web 40, becoming adhered snugly thereto in passing beneath guide and tensioning roller 41 and upwardly into a conventional former 46. The former shapes the web material into a tube lapping the side marginal edges thereof, and conventional means are provided for longitudinally seaming the overlapped marginal edges of the wide web 40. Thus the label strip 42 will be enclosed within the longitudinally sealed tube 48 depending from the former 46. Conventional sealing and severing means 50 are provided for transversely sealing the tube to effect a top final closure on a completed package and a lowermost transverse seal on a package about to be formed. Following formation of a bottom transverse seal on the tubing 48, the article charge is deposited into the tube through the former 46, and the tube 48 is lowered relative to the sealing bars 50 by conventional means. The top seal is then formed to complete the package and fully enclose the contents. This method of packaging is especially desirable for articles of smaller size or granular materials such as rice or the like, wherein the method of packaging illustrated in FIG. 1 would be unsuitable. As before, the label strip 42 adheres firmly to the transparent web 40 during running thereof and folding of the transparent web into a tube, requiring no further bonding as by adhesive or other means, and wherein the ends of the label strip in each package will be bonded into the transverse end seams thereof as illustrated in FIG. 11. It is apparent that the labeling and packaging technique of my invention may be employed with any product, whether in bulk form as bananas or frankfurters, partially prepackaged as fruit trays, or in overwrapping cartoned products. Similarly, the method thereof may be readily adapted to other packaging techniques within the scope thereof.

From the foregoing it will be apparent that my novel labeling and packaging method materially reduces packaging costs by effectively minimizing the expense of printed thermoplastic film material as compared with known packaging methods using such films. Further, by employing the inherent bonding tendency of thermoplastic films, the label is tightly secured to the packaging material from which the same will not be dislodged during packaging operations or other handling, remaining in view for the benefit of the ultimate consumer to identify the source of the products and the character thereof, yet is protected from damage or removal.

What I claim is:

1. In a method of packaging, the steps of
advancing spaced superposed webs of transparent thermoplastic packaging material,
simultaneously advancing a spaced parallel pair of narrow webs of printed thermoplastic packaging material between said superposed webs and in intimate contact with one of said superposed webs to cause snug adherence therebetween,
placing two charges of contents in spaced transverse relation between said superposed webs,
longitudinally severing said superposed webs between said article charges and between said printed films,
transversely severing said superposed webs forwardly and rearwardly of said charges,
and heat sealing said webs along the longitudinal and transverse lines of severence to form two cup-like labeled packages having one open end.

2. A method of packaging articles from supplies of transparent thermoplastic film and relatively narrow printed thermoplastic film, comprising the steps of
advancing superposed lengths of a first transparent film and laterally spaced parallel lengths of said printed film,
pressing said film lengths into intimate contact to cause said printed films to snugly adhere to said transparent film,
advancing a length of a second transparent film in spaced superposed relation to said first transparent film to dispose said pair of printed films therebetween,
transversely heat sealing the leading ends of said films,
inserting two article charges in spaced transverse relation between said superposed transparent films,
uniformly advancing said charges against said sealed film ends to draw additional lengths of said films from the supplies thereof,
longitudinally severing said superposed webs between said article charges and between said printed films,
transversely severing said films rearwardly of said article charges, and heat sealing said films along the longitudinal and transverse lines of severance to form two cup-like labeled packages.

References Cited by the Examiner

UNITED STATES PATENTS

| | | | |
|---|---|---|---|
| 2,082,114 | 6/1937 | Littlefield. | |
| 2,260,064 | 10/1941 | Stokes | 93—35 X |
| 2,698,046 | 12/1954 | Finke | 53—28 X |
| 2,815,620 | 12/1957 | Prodigo | 53—14 |
| 2,878,628 | 3/1959 | Curry | 53—30 |
| 3,172,246 | 3/1965 | Ruff | 53—182 X |

GRANVILLE Y. CUSTER, JR., *Primary Examiner.*

TRAVIS S. McGEHEE, FRANK E. BAILEY,
*Examiners.*

S. ABEND, *Assistant Examiner.*